US012619946B2

(12) United States Patent
Qiu et al.

(10) Patent No.: US 12,619,946 B2
(45) Date of Patent: May 5, 2026

(54) PARALLEL PROCESSING CANDIDATE PAIRINGS OF DELIVERY AGENTS WITH ROUTES TO FULFILL DELIVERY ORDERS AND ASYNCHRONOUS SELECTING OPTIMAL PAIRINGS FROM THE CANDIDATES

(71) Applicant: Maplebear Inc., San Francisco, CA (US)

(72) Inventors: Xianlei Qiu, San Carlos, CA (US); Site Wang, Fremont, CA (US); Deepak Tirumalasetty, Castro Valley, CA (US)

(73) Assignee: Maplebear Inc., San Francisco, CA (US)

( * ) Notice: Subject to any disclaimer, the term of this patent is extended or adjusted under 35 U.S.C. 154(b) by 335 days.

(21) Appl. No.: 17/733,267

(22) Filed: Apr. 29, 2022

(65) Prior Publication Data

US 2023/0351319 A1 Nov. 2, 2023

(51) Int. Cl.
*G06Q 10/087* (2023.01)
*G06Q 30/0283* (2023.01)

(52) U.S. Cl.
CPC ....... *G06Q 10/087* (2013.01); *G06Q 30/0283* (2013.01)

(58) Field of Classification Search
CPC ............. G06Q 10/087; G06Q 30/0283; G06Q 10/08355; G06Q 30/0635
See application file for complete search history.

(56) References Cited

U.S. PATENT DOCUMENTS

| | | | |
|---|---|---|---|
| 5,953,707 A | | 9/1999 | Huang et al. |
| 9,105,060 B2 * | | 8/2015 | Benson .................. G06Q 10/00 |
| 9,172,738 B1 * | | 10/2015 | daCosta ............ G06Q 30/0601 |
| 2004/0064351 A1 | | 4/2004 | Mikurak |
| 2007/0094066 A1 | | 4/2007 | Kumar et al. |
| 2007/0192200 A1 * | | 8/2007 | Weng ...................... G06Q 30/06 705/26.81 |
| 2018/0225612 A1 * | | 8/2018 | Enssle .............. G06Q 10/06315 |

(Continued)

OTHER PUBLICATIONS

PCT International Search Report and Written Opinion, PCT Application No. PCT/US2023/15143, Jun. 14, 2023, 9 pages.

*Primary Examiner* — Fahd A Obeid
*Assistant Examiner* — Jessica E Sullivan
(74) *Attorney, Agent, or Firm* — Fenwick & West LLP

(57) ABSTRACT

An online concierge system receives information describing orders from its customers and generates a route for each order based on this information. The routes are partitioned into multiple sets of routes and multiple candidate generation processes are executed in parallel. During execution of a candidate generation process, one or more routes included in each set of routes are paired with shoppers of the system based on a set of constraints, producing multiple route-shopper pairs. A cost associated with each route-shopper pair is determined based on attributes associated with each shopper and/or information associated with each route of the pair. During an optimization process, which is executed asynchronously with the candidate generation process, one or more route-shopper pairs are selected based on pairing-cost data identifying route-shopper pairs and their associated costs. One or more requests to fulfill orders are sent to one or more shoppers based on the selected route-shopper pair(s).

18 Claims, 6 Drawing Sheets

100

(56) References Cited

U.S. PATENT DOCUMENTS

| | | | |
|---|---|---|---|
| 2019/0114583 A1* | 4/2019 | Ripert | G06Q 30/0635 |
| 2019/0171206 A1* | 6/2019 | Abrams | G01C 21/3658 |
| 2019/0378198 A1* | 12/2019 | Turlay | G06Q 20/18 |
| 2024/0354710 A1* | 10/2024 | Logiotatidis | G06F 40/205 |

* cited by examiner

100

200

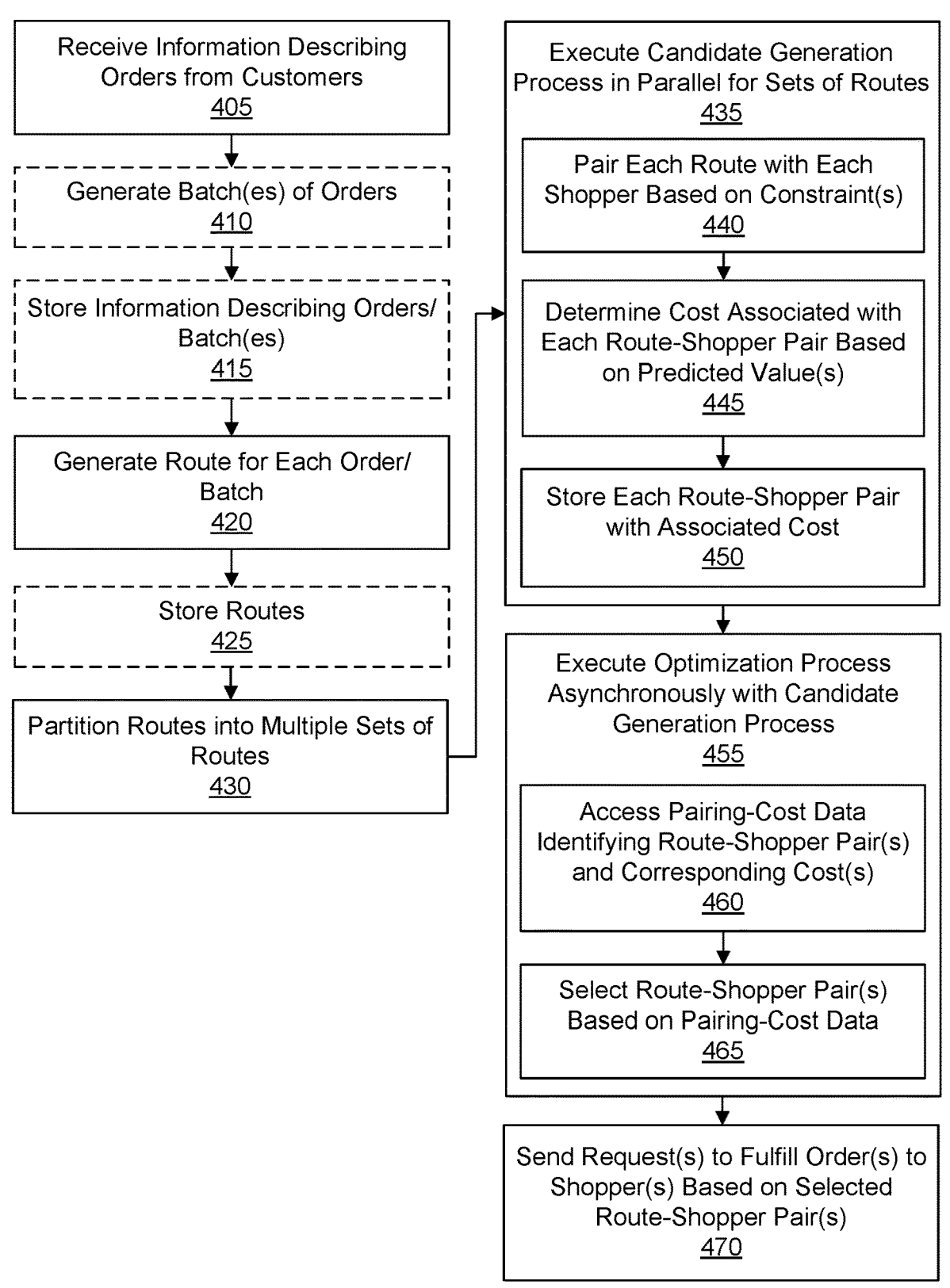

Receive Information Describing Orders from Customers
405

Generate Batch(es) of Orders
410

Store Information Describing Orders/ Batch(es)
415

Generate Route for Each Order/ Batch
420

Store Routes
425

Partition Routes into Multiple Sets of Routes
430

Execute Candidate Generation Process in Parallel for Sets of Routes
435

Pair Each Route with Each Shopper Based on Constraint(s)
440

Determine Cost Associated with Each Route-Shopper Pair Based on Predicted Value(s)
445

Store Each Route-Shopper Pair with Associated Cost
450

Execute Optimization Process Asynchronously with Candidate Generation Process
455

Access Pairing-Cost Data Identifying Route-Shopper Pair(s) and Corresponding Cost(s)
460

Select Route-Shopper Pair(s) Based on Pairing-Cost Data
465

Send Request(s) to Fulfill Order(s) to Shopper(s) Based on Selected Route-Shopper Pair(s)
470

FIG. 4

| Route ID 605 | Shopper ID 610 | Predicted Driving Time 615 | Predicted Driving Distance (miles) 620 | Predicted Collecting Time 625 | Cost 630 |
|---|---|---|---|---|---|
| 1 | 1 | 00:35:54 | 23.4 | 00:53:13 | 112.07 |
| 1 | 2 | 00:47:07 | 30.2 | 01:26:04 | 203.31 |
| 2 | 2 | 01:05:24 | 15.9 | 00:43:23 | 164.37 |
| 2 | 4 | 00:41:27 | 18.6 | 00:52:19 | 61.73 |
| 3 | 1 | 00:13:26 | 13.9 | 00:06:56 | 39.54 |
| 3 | 2 | 00:20:36 | 17.0 | 00:09:28 | 46.64 |
| 3 | 3 | 00:33:21 | 21.6 | 00:05:57 | 60.38 |
| ⋮ | ⋮ | ⋮ | ⋮ | ⋮ | ⋮ |

Pairing Cache 336

PARALLEL PROCESSING CANDIDATE PAIRINGS OF DELIVERY AGENTS WITH ROUTES TO FULFILL DELIVERY ORDERS AND ASYNCHRONOUS SELECTING OPTIMAL PAIRINGS FROM THE CANDIDATES

BACKGROUND

This disclosure relates generally to selecting delivery agents to fulfill orders placed in an online concierge system, and more specifically to selecting optimal pairings of delivery agents to fulfill orders using a set of parallel processes to select a feasible space of candidate pairings and an asynchronous process to select optimal pairings from the candidates.

Online concierge systems allow customers to place online delivery orders and match the orders with delivery agents (i.e., shoppers) to fulfill the orders at physical retailers on behalf of the customers. Shoppers may fulfill orders by performing different tasks involved in fulfilling each order. For example, tasks involved in fulfilling an order may include driving to a particular retail store, collecting one or more items included in the order, purchasing the items, and delivering the items to a customer.

Online concierge systems typically select shoppers to fulfill orders in a way that minimizes cost while maximizing customer satisfaction. To do so, an online concierge system may select physical retail locations at which orders may be fulfilled, determine routes shoppers may take to fulfill the orders, and then select shoppers to fulfill the orders based on the routes while accounting for various factors that affect cost. Examples of such factors include travel time and distance, traffic conditions during different times of the day, whether multiple shoppers should be involved in fulfilling a single order, whether a single shopper should be involved in fulfilling a batch of orders, variations in the amount of time it may take shoppers to perform different tasks, etc. An online concierge system also may account for various factors that affect customer satisfaction, such as the availability of different items included in each order at different physical retail locations, whether a shopper is likely to make an error when collecting items included in an order, etc. Furthermore, an online concierge system may be required to observe various constraints, such as age restrictions associated with purchasing certain items (e.g., alcohol or tobacco) that may be included in orders, membership requirements associated with different retailers with which orders may be placed, availability of shoppers to fulfill orders to be delivered within delivery windows specified by customers, etc.

However, the processes that online concierge systems might use to select shoppers to fulfill orders is often characterized by high latency and might not be scalable to meet increasing demand. Due to the large number of orders that may be received by online concierge systems, it may take an online concierge system an inordinate amount of time to consider different combinations of physical retail locations at which orders may be fulfilled to determine the routes shoppers may take to fulfill the orders. Once the routes have been determined, it may also take the online concierge system an excessive amount of time to consider different combinations of shoppers who may be involved in fulfilling its orders. Additionally, the factors and constraints described above only complicate this process and may further increase the amount of time required to select shoppers to fulfill orders. Moreover, the amount of time required to select shoppers to fulfill orders increases during peak hours (e.g., when physical retail locations open) and as online concierge systems increase in popularity.

SUMMARY

Online concierge systems allow customers to place online delivery orders and match the orders with shoppers to fulfill the orders at physical retailers on behalf of the customers. Online concierge systems typically will select shoppers to fulfill the orders in a way that minimizes cost while maximizing customer satisfaction. However, the processes that online concierge systems might use to do so is often characterized by high latency and might not be scalable due to the large number of orders that may be received by online concierge systems, the different combinations of physical retail locations at which orders may be fulfilled and shoppers who may be involved in fulfilling the orders, and various additional factors and constraints. These problems are further exacerbated during peak hours and as online concierge systems increase in popularity.

To reduce latency, improve scalability, and address other technical challenges, an online concierge system selects optimal pairings of shoppers with routes to fulfill orders placed in the online concierge system using an asynchronous process, in accordance with one or more aspects of the disclosure. More specifically, the online concierge system receives information describing orders from customers of the online concierge system, in which the information describing each order identifies a retailer associated with the order, one or more items included in the order, a location associated with a customer associated with the order, and a delivery time window associated with the order. The online concierge system then generates a route for each order based on the information describing the order, which results in multiple routes. Each route that is generated identifies a location of a warehouse associated with the retailer for a corresponding order.

The routes are then partitioned into multiple sets of routes, and multiple candidate generation processes are executed in parallel for the sets of routes, such that a candidate generation process is executed with respect to a particular set of routes. Performing the candidate generation process for a large set of routes in multiple parallel processes reduces latency. Scalability is improved by partitioning the routes into more sets of routes, and cost reduction may be achieved by using a greater number of less expensive workers to perform the candidate generation process on each set of routes. During the candidate generation process, each route is paired with each of multiple shoppers of the online concierge system based on a set of constraints, resulting in multiple route-shopper pairs, and a cost associated with each route-shopper pair is determined based on a set of predicted values. The predicted values are based on attributes associated with each shopper and/or information associated with each route included in the route-shopper pair.

An optimization process is executed asynchronously with the candidate generation process, which further improves latency since it is not dependent on completion of the candidate generation process for all of the sets of routes. During the optimization process, one or more route-shopper pairs are selected based on pairing-cost data identifying route-shopper pairs and the cost associated with each route-shopper pair. The online concierge system then sends one or more requests to fulfill a set of orders to one or more shoppers based on the selected route-shopper pair(s).

BRIEF DESCRIPTION OF THE DRAWINGS

FIG. 4 is a flowchart of a method for selecting optimal pairings of shoppers with routes to fulfill orders placed in an online concierge system using an asynchronous process, according to one or more embodiments.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
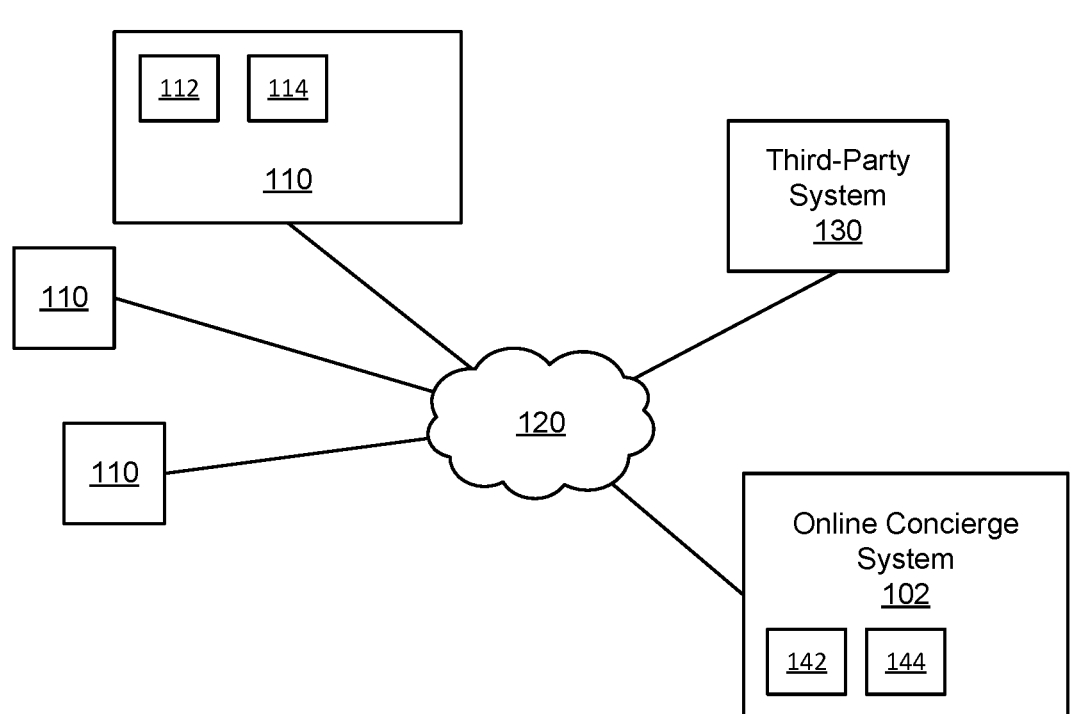
FIG. 1 is a block diagram of a system environment in which an online system, such as an online concierge system, operates, according to one or more embodiments.

FIG. 1 is a block diagram of a system environment 100 in which an online system, such as an online concierge system 102 as further described below in conjunction with FIGS. 2 and 3, operates. The system environment 100 shown in FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIG. 2, to enable interaction between the client device 110 and the online concierge system 102. As an additional example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing various functions. In various embodiments, a client device 110 includes a memory 114 comprising a non-transitory storage medium on which instructions are encoded. The memory 114 may have instructions encoded thereon that, when executed by the processor 112, cause the processor 112 to perform functions to execute the customer mobile application 206 or the shopper mobile application 212 to provide the functions further described below in conjunction with FIG. 2.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online concierge system 102 or with the client device(s) 110. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. For example, a third-party system 130 stores one or more web pages and transmits the web pages to a client device 110 or to the online concierge system 102. A third-party system 130 may also communicate information to the online concierge system 102, such as advertisements, content, or information about an application provided by the third-party system 130.

The online concierge system 102 includes one or more processors 142 configured to control operation of the online concierge system 102 by performing various functions. In various embodiments, the online concierge system 102 includes a memory 144 comprising a non-transitory storage medium on which instructions are encoded. The memory 144 may have instructions encoded thereon corresponding to the modules further described below in conjunction with FIG. 3 that, when executed by the processor 142, cause the processor 142 to perform the functionality further described below in conjunction with FIGS. 2, 4, 5, and 6. For example, the memory 144 has instructions encoded thereon that, when executed by the processor 142, cause the processor 142 to select optimal pairings of shoppers with routes to fulfill orders placed in the online concierge system 102 using an asynchronous process. Additionally, the online concierge system 102 includes a communication interface configured to connect the online concierge system 102 to one or more networks, such as network 120, or to otherwise communicate with devices (e.g., client devices 110) connected to the network(s).

One or more of a client device 110, a third-party system 130, or the online concierge system 102 may be special-purpose computing devices configured to perform specific functions, as further described below in conjunction with FIGS. 2-6, and may include specific computing components such as processors, memories, communication interfaces, and/or the like.

System Overview

Figure 2:
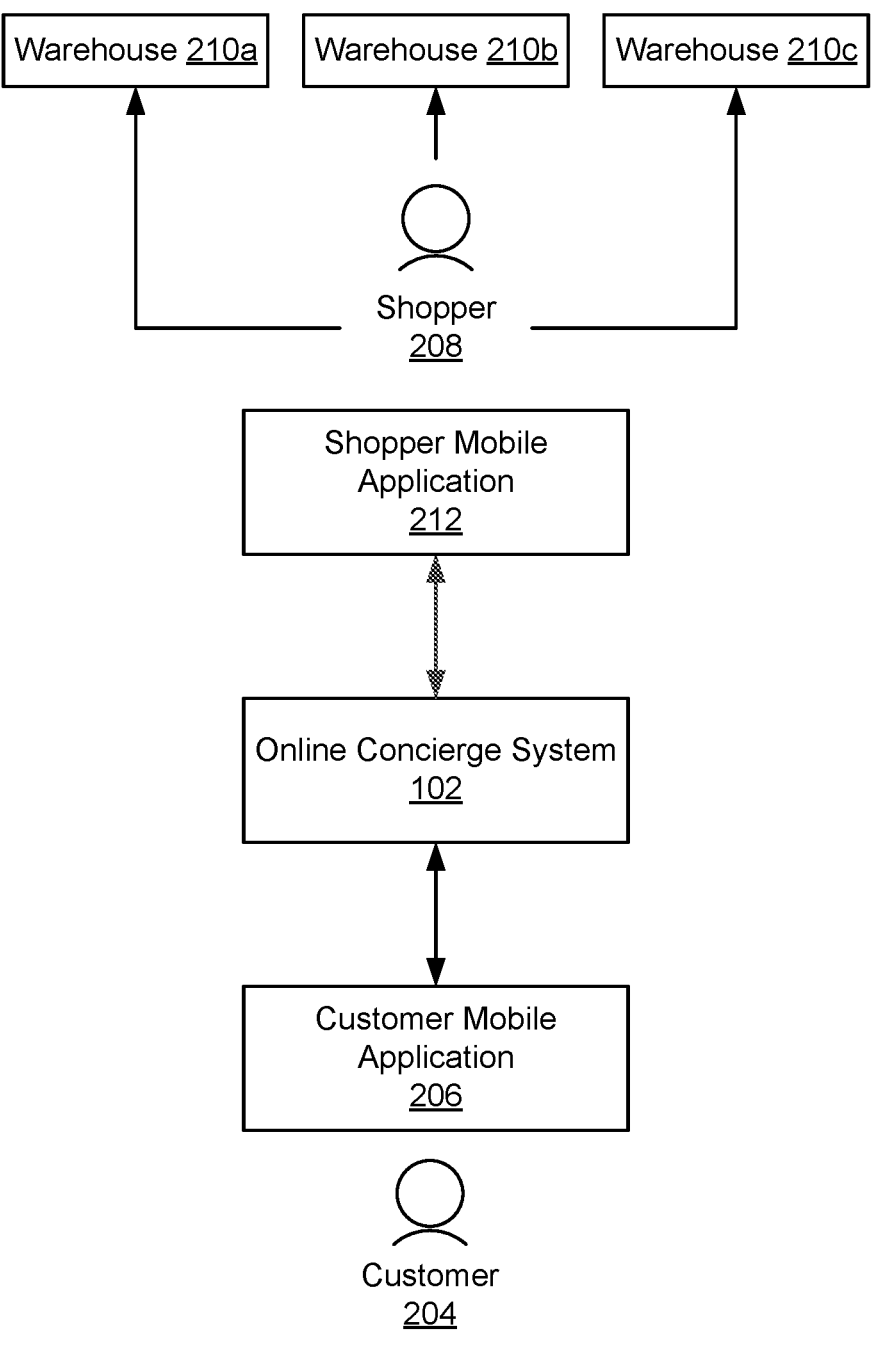
FIG. 2 illustrates an environment of an online concierge system, according to one or more embodiments.

FIG. 2 illustrates an environment 200 of an online platform, such as an online concierge system 102, according to one or more embodiments. The figures use like reference numerals to identify like elements. A letter after a reference numeral, such as "210*a*," indicates that the text refers specifically to the element having that particular reference numeral. A reference numeral in the text that is not followed by a letter, such as "210," refers to any or all of the elements in the figures bearing that reference numeral. For example, "210" in the text may refer to reference numerals "210*a*," "210*b*," and/or "210*c*" in the figures.

The environment 200 includes an online concierge system 102. The online concierge system 102 is configured to receive orders from one or more customers 204 (only one is shown for the sake of simplicity). An order specifies a list of goods (items or products) to be delivered to a customer 204. An order also specifies a location to which goods are to be delivered, and a time window during which the goods should be delivered. In some embodiments, an order specifies one or more retailers from which the goods should be purchased. A customer 204 may use a customer mobile application (CMA) 206, which is configured to communicate with the online concierge system 102, to place an order.

The online concierge system 102 is configured to transmit orders received from customers 204 to one or more shoppers 208. A shopper 208 may be a person (e.g., a contractor, an employee, etc.), an entity, or an autonomous device (e.g., a robot) enabled to fulfill orders received by the online concierge system 102. A shopper 208 travels between a warehouse 210 and a delivery location (e.g., a customer's home or office) and may do so by car, truck, bicycle, scooter, foot, or via any other mode of transportation. In some embodiments, a delivery may be partially or fully automated, e.g., using a self-driving car. The environment 200 also includes three warehouses 210*a*, 210*b*, and 210*c* (while only three are shown for the sake of simplicity, the environment 200 may include hundreds of warehouses 210). The warehouses 210 may be physical retailers, such as grocery stores, discount stores, department stores, etc., or non-public warehouses 210 storing items that may be collected and delivered to customers 204. Each shopper 208 fulfills an order received from the online concierge system 102 at one or more warehouses 210, delivers the order to the customer 204, or performs both fulfillment and delivery. In one embodiment, shoppers 208 make use of a shopper mobile application 212 which is configured to interact with the online concierge system 102.

Figure 3:
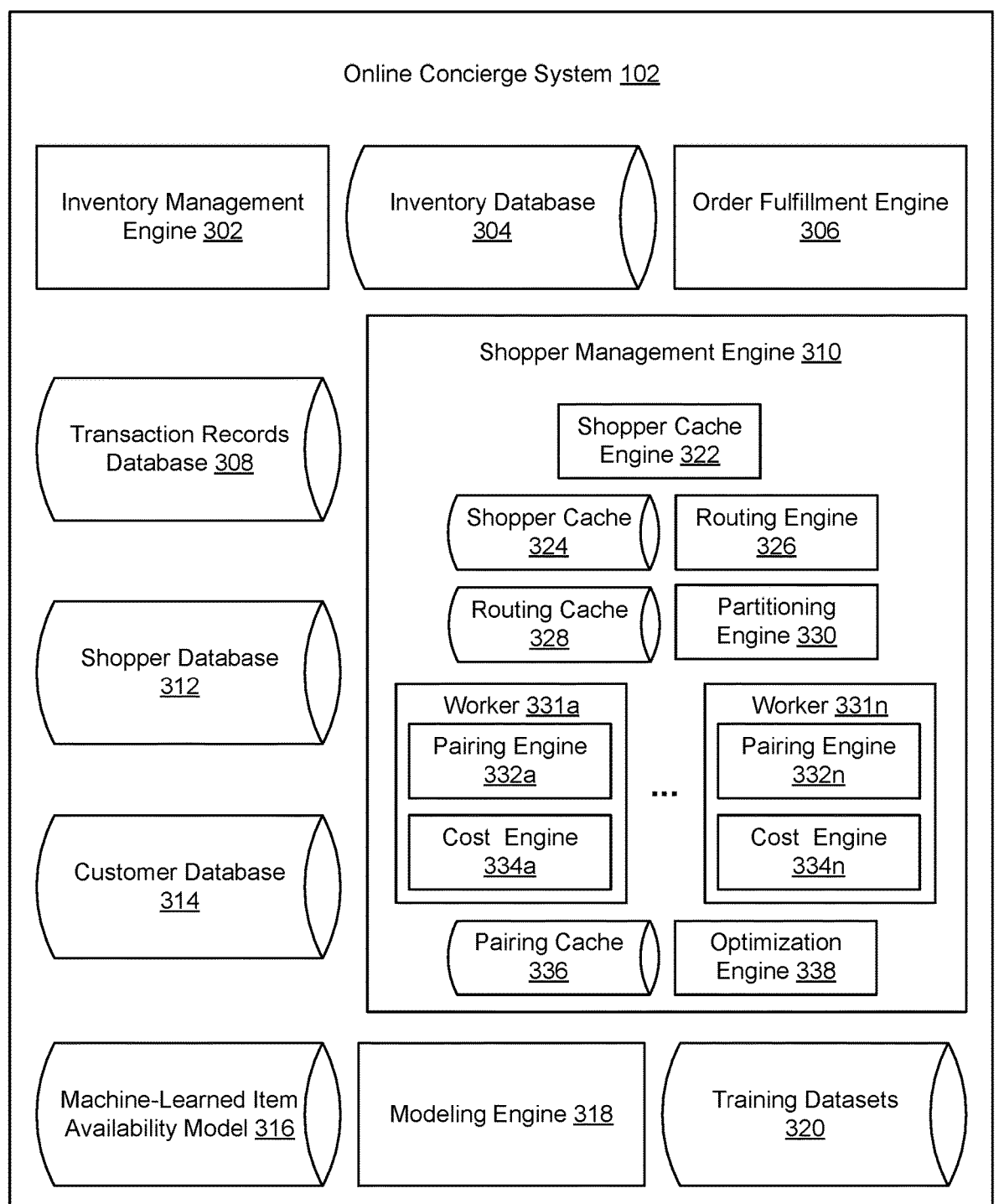
FIG. 3 is a diagram of an online concierge system, according to one or more embodiments.

FIG. 3 is a diagram of an online concierge system 102, according to one or more embodiments. In various embodiments, the online concierge system 102 may include different or additional modules than those described in conjunction with FIG. 3. Furthermore, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by a warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and quantitative information about the items, including size, color, weight, SKU, serial number, etc. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse 210), the inventory database 304 may store a time that the item was last found, a time that the item was last not found (e.g., if a shopper 208 looked for the item but could not find it), a rate at which the item is found, and a popularity of the item.

For each item, the inventory database 304 identifies one or more attributes of the item and corresponding values for each attribute of the item. For example, the inventory database 304 includes an entry for each item offered by a warehouse 210, in which an entry for an item includes an item identifier that uniquely identifies the item. The entry includes different fields, with each field corresponding to an attribute of the item. A field of an entry includes a value for an attribute corresponding to the field, allowing the inventory database 304 to maintain values of different attributes for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210, in which different levels of the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.) with the category. Thus, the taxonomy maintains associations between a category and specific items offered by the warehouse 210 matching the category. In some embodiments, different levels of the taxonomy identify items with differing levels of specificity based on any suitable attribute or combination of attributes of the items. For example, different levels of the taxonomy specify different combinations of attributes of items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include fewer details about items, so greater numbers of items are included in higher levels (e.g., higher levels include a greater number of items satisfying a broader category). Similarly, lower levels in the taxonomy include greater details about items, so fewer numbers of items are included in the lower levels (e.g., lower levels include a fewer number of items satisfying a more specific category). The taxonomy may be received from a warehouse 210 in various embodiments. In other embodiments, the inventory management engine 302 applies a trained classification model to an item catalog received from a warehouse 210 to include different items in levels of the taxonomy, so application of the trained classification model associates specific items with categories corresponding to levels within the taxonomy.

The online concierge system 102 also includes an order fulfillment engine 306 which is configured to synthesize and display an ordering interface to each customer 204 (for example, via the customer mobile application 206). The order fulfillment engine 306 is also configured to access the inventory database 304 in order to determine which items are available at which warehouse 210. The order fulfillment engine 306 may supplement the item availability information from the inventory database 304 with item availability information, e.g., as predicted by a machine learning item availability model. The order fulfillment engine 306 determines a sale price for each item ordered by a customer 204. Prices set by the order fulfillment engine 306 may or may not be identical to in-store prices determined by retailers (which is the price that customers 204 and shoppers 208 would pay at the retail warehouses 210). The order fulfillment engine 306 also facilitates transactions associated with each order. In one embodiment, the order fulfillment engine 306 charges a payment instrument associated with a customer 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device 110 of a customer 204 for display via the customer mobile application 206. The order fulfillment engine 306 receives a query comprising one or more terms from a customer 204 and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. Details of an order may indicate the items purchased, a total value of the items, and in some cases, an identity of a shopper 208 and a customer 204 associated with the order. In one embodiment, the order fulfillment engine 306 pushes transaction and/or order details asynchronously to retailer systems. This may be accomplished via the use of webhooks, which enable programmatic or system-driven transmission of information between web applications. In another embodiment, retailer systems may be configured to periodically poll the order fulfillment engine 306, which provides details of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 then identifies the appropriate warehouse 210 to fulfill the order based on one or more parameters, such as a probability of item availability determined by a machine learning item availability model, the contents of the order, the inventory of the warehouses 210, and the proximity of the warehouses 210 to the delivery location. The shopper management engine 310 then identifies one or more appropriate shoppers 208 to fulfill the order based on one or more parameters, such as the shoppers' proximity to the appropriate warehouse 210 (and/or to the customer 204), his/her familiarity level with that particular warehouse 210, etc. Additionally, the shopper management engine 310 accesses a shopper database 312 which stores information describing each shopper 208, such as his/her name, gender, rating, previous shopping history, etc.

As part of fulfilling an order, the order fulfillment engine 306 and/or shopper management engine 310 may access a customer database 314, which stores information describing each customer 204. This information may include each customer's name, address, gender, shopping preferences, favorite items, stored payment instruments, etc.

In various embodiments, the order fulfillment engine 306 determines whether to delay display of a received order to shoppers 208 for fulfillment by a time interval. In response to determining to delay display of the received order by a time interval, the order fulfilment engine 306 evaluates subsequent orders received during the time interval for inclusion in one or more batches that also include the received order. The order fulfilment engine 306 may evaluate the subsequent orders received during the time interval for inclusion in a batch based on additional information associated with the orders (e.g., retailers associated with the orders, one or more items included in the orders, locations associated with customers 204 who placed the orders, delivery time windows for the orders, etc.), such that orders associated with similar information are more likely to be included in the same batch. For example, orders to be delivered to customers 204 associated with locations that are close to each other are more likely to be batched together than orders to be delivered to customers 204 associated with locations that are far apart. After the time interval, the order fulfillment engine 306 displays the order to one or more shoppers 208 via the shopper mobile application 212; if the order fulfillment engine 306 generated one or more batches including the received order and one or more subsequent orders received during the time interval, the batch(es) is/are also displayed to one or more shoppers 208 via the shopper mobile application 212.

The shopper management engine 310 includes a shopper cache engine 322, which is used to access information about shoppers 208 from the shopper database 312, and a shopper cache 324, which is a cache memory used to store this information, making its retrieval more efficient. As described above, information describing each shopper 208 that may be stored in the shopper database 312 may include the shopper's name, gender, rating, previous shopping history, etc. In addition to this information, information stored in the shopper database 312 describing each shopper 208 that may be accessed by the shopper cache engine 322 and stored in the shopper cache 324 may include information describing an age of a shopper 208, a cargo capacity associated with a shopper 208 (e.g., based on a type of car driven by the shopper 208), a location associated with a shopper 208 (e.g., a home or work address of the shopper 208), or any other information associated with a shopper 208.

The shopper management engine 310 also includes a routing engine 326, which generates one or more routes for each order received by the online concierge system 102 based on information describing the order. Each route generated by the routing engine 326 may be associated with an identifier (e.g., a route ID) that uniquely identifies the route. A route generated for an order may describe tasks that may be involved in fulfilling the order, such as proceeding to a location of a warehouse 210 associated with a retailer with which the order was placed, collecting items included in the order, purchasing the items, and delivering the items to a delivery location specified by a customer 204 who placed the order. In some embodiments, a route generated for an order also may include turn-by-turn instructions for navigating to each location a shopper 208 is required to visit to fulfill the order. Furthermore, in various embodiments, the routing engine 326 may determine various types of information associated with a route. Examples of such information include fees associated with a route, speed limits along a route, traffic conditions associated with a route (e.g., on various days and/or during various times of the day), or any other suitable types of information that may be associated with a route. For example, fees associated with a route may include tolls (e.g., for crossing toll bridges or to use toll roads), parking fees (e.g., to park in parking lots or at parking meters while collecting and purchasing items in an order), etc.

The routing engine 326 may leverage other engines, models, and databases within the online concierge system 102 and generate one or more routes for an order based on information describing the order. For example, based on information identifying items included in an order, a retailer with which the order was placed, and a delivery time window for the order, the routing engine 326 may access the inventory database 304 and a machine-learned item availability model 316 to identify warehouses 210 associated with the retailer at which the items included in the order are likely to be available for delivery within the delivery time window. In this example, based on information identifying a customer 204 who placed the order, the routing engine 326 may access information stored in the customer database 314 to retrieve a location associated with the customer 204 (e.g., a home address or default/preferred delivery location). Continuing with this example, the routing engine 326 then generates one or more routes for fulfilling the order based on the warehouses 210 associated with the retailer at which the items included in the order are likely to be available and the location associated with the customer 204. In some embodiments, the routing engine 326 may generate a route based on a distance between a location associated with a customer 204 and a location of a warehouse 210 and/or an amount of time required to travel this distance. In the above example, the warehouses 210 identified by the routes generated by the routing engine 326 may be within a threshold distance of the location associated with the customer 204 and/or the amount of time required to travel the distance between them may be less than a threshold amount of time.

In some embodiments, the routing engine 326 may generate one or more routes for a batch of orders generated by the order fulfillment engine 306. In such embodiments, the routing engine 326 may leverage other engines, models, and databases within the online concierge system 102 and generate the route(s) for the batch of orders based on information describing the orders, as described above. Furthermore, in such embodiments, the routing engine 326 may generate the route(s) for a batch of orders based on distances between locations associated with customers 204 and locations of warehouses 210 and/or amounts of time required to travel these distances, as described above.

The shopper management engine 310 also includes a routing cache 328, which is a cache memory used to store routes generated by the routing engine 326, making their retrieval more efficient. In some embodiments, each route is stored in the routing cache 328 in association with an identifier (e.g., a route ID) that uniquely identifies the route. In embodiments in which the routing engine 326 determines various types of information associated with a route, this information also may be stored in association with the route in the routing cache 328. For example, the routing cache 328 may store information describing a speed limit along a route and average traffic conditions along the route in association with the route.

The shopper management engine 310 also includes a partitioning engine 330, which partitions routes into multiple sets of routes. The partitioning engine 330 may partition routes via various methods. In one embodiment, the partitioning engine 330 partitions routes randomly. In another embodiment, the partitioning engine 330 partitions routes based on an order in which the orders associated with the routes were received (e.g., chronologically). The number of sets of routes into which the partitioning engine 330 partitions routes may be proportional to the number of routes generated by the routing engine 326. For example, every 100 routes may be partitioned into 10 sets of 10 routes. In some embodiments, the number of sets of routes into which the partitioning engine 330 partitions routes may be determined using a machine-learning model that predicts an optimal number of sets of routes. In such embodiments, the machine-learning model may be trained based on historical information describing a number of sets of routes into which the partitioning engine 330 has partitioned routes and an amount of time required to perform a candidate generation process on the sets of routes, which is further described below. Since the candidate generation process is performed in parallel for each of the sets of routes, as described below, scalability may be improved by partitioning the routes into more sets of routes. Furthermore, cost reduction may be achieved by using a greater number of less expensive workers 331 (described below) to perform the candidate generation process on each set of routes.

In one embodiment, the partitioning engine 330 partitions routes based on a set of rules. The set of rules may be associated with an age restriction associated with purchasing an item included in an order, a membership associated with a retailer, a minimum cargo capacity associated with an order, a location of a warehouse 210 associated with a retailer, a location associated with a customer 204, or any other suitable types of information associated with a route. For example, if the partitioning engine 330 partitions routes based on a rule corresponding to an age restriction associated with purchasing alcoholic beverages, the partitioning engine 330 may include routes generated for orders including alcoholic beverages in the same set of routes. In the above example, if the partitioning engine 330 also partitions routes based on a rule that requires memberships associated with various retailers, the partitioning engine 330 may include routes generated for orders including alcoholic beverages for each retailer requiring a membership in the same set of routes. As another example, if the partitioning engine 330 partitions routes based on a rule corresponding to a minimum cargo capacity associated with each route, the partitioning engine 330 may partition routes into different sets of routes that each are associated with a different range of minimum cargo capacities. As an additional example, if the partitioning engine 330 partitions routes based on a rule associated with a location of a warehouse 210 associated with a retailer and/or a location associated with a customer 204, the partitioning engine 330 may partition routes into different sets of routes that each are associated with a different geographic location, in which each set of routes is associated with a location of a warehouse 210 and/or a location associated with a customer 204 that is in the same geographic location.

The shopper management engine 310 also includes multiple workers 331, each of which includes a pairing engine 332 and a cost engine 334. Once the partitioning engine 330 has partitioned routes into multiple sets of routes, multiple workers 331 included in the shopper management engine 310 execute multiple candidate generation processes in parallel for the sets of routes, such that a candidate generation process is executed with respect to a particular set of routes by a worker 331. As such, the candidate generation process for one set of routes may be executed independently of the candidate generation process for a different set of routes, reducing latency. The candidate generation process includes three steps, which are further described below.

In the first step of the candidate generation process, each pairing engine 332 pairs each route included among a set of routes with each of multiple shoppers 208 of the online concierge system 102, which results in multiple route-shopper pairs. A pairing engine 332 may retrieve information describing each shopper 208 from the shopper database 312. Alternatively, in various embodiments, to improve the efficiency with which a pairing engine 332 may retrieve information describing each shopper 208, the pairing engine 332 may retrieve this information from the shopper cache 324. In some embodiments, the pairing engine 332 pairs each route with a shopper 208 based on a set of constraints. The set of constraints may include an age restriction associated with purchasing an item, a membership required by a retailer, a minimum cargo capacity, a threshold distance between a location associated with a shopper 208 and a location associated with an order (e.g., a location of a customer 204 and/or a warehouse 210 associated with a retailer), a threshold amount of time required to travel a distance between a location associated with a shopper 208 and a location associated with an order, an availability of a shopper 208 to fulfill an order, etc. For example, if the set of constraints includes an age restriction associated with purchasing various items (e.g., alcohol, tobacco, prescriptions, etc.), the pairing engine 332 may only pair routes generated for orders including such items with shoppers 208 who satisfy the age restriction. As an additional example, if the set of constraints includes a membership required by a retailer, the pairing engine 332 may only pair routes generated for orders with the retailer with shoppers 208 who have the required membership. As yet another example, if the set of constraints includes a minimum cargo capacity associated with an order, the pairing engine 332 may only pair a route generated for the order with shoppers 208 associated with a cargo capacity that is at least the minimum cargo capacity. As another example, suppose that the set of constraints includes a threshold distance between a shopper 208 and one or more locations associated with an order (e.g., a location of a customer 204 and/or a warehouse 210 associated with a retailer) or a threshold amount of time required to travel a distance between the shopper 208 and the location(s) associated with the order. In this example, the pairing engine 332 may only pair a route generated for the order with shoppers 208 associated with locations within the threshold distance of the location associated with the order or with shoppers 208 who may travel to the location associated with the order within the threshold amount of time.

Each route-shopper pair output by the pairing engine 232 may be associated with a set of predicted values that are based on a set of attributes associated with a shopper 208 included in the route-shopper pair and/or information associated with a route included in the route-shopper pair. In some embodiments, the set of predicted values associated with a route-shopper pair may be associated with a measure of efficiency of the route-shopper pair. For example, a set of predicted values associated with a route-shopper pair may include a predicted amount of time a shopper 208 included in the route-shopper pair is required to travel to fulfill an order associated with a route included in the route-shopper pair and/or a predicted distance the shopper 208 is required to travel to fulfill the order. As an additional example, a set of predicted values associated with a route-shopper pair may include a predicted amount of time required for a shopper 208 included in the route-shopper pair to collect items included in an order associated with a route included in the route-shopper pair and/or a predicted likelihood that the shopper 208 will make an error collecting the items.

In some embodiments, the set of predicted values associated with each route-shopper pair may be predicted using a machine learning model based on a set of attributes associated with a shopper 208 included in the route-shopper pair and/or information associated with a route included in the route-shopper pair. In such embodiments, the model may be trained based on historical information associated with previous orders stored in the online concierge system 102 (e.g., in the shopper database 312, etc.). For example, the machine learning model may predict an amount of time required by a shopper 208 to collect items included in an order associated with a route with which the shopper 208 is paired and a rating the shopper 208 is likely to receive when fulfilling the order based on a shopping history of the shopper 208 and previous ratings received by the shopper 208 stored in the shopper database 312.

In the second step of the candidate generation process, once each route included among a set of routes is paired with a shopper 208, a cost engine 334 determines a cost associated with the route-shopper pair based on the set of predicted values associated with the route-shopper pair. In some embodiments, the cost associated with a route-shopper pair may indicate an efficiency of the route-shopper pair. For example, the cost associated with a route-shopper pair may indicate an efficiency associated with fulfillment of an order associated with the route by the shopper 208. Furthermore, the cost associated with a route-shopper pair may be inversely proportional to an efficiency of the route-shopper pair, such that route-shopper pairs associated with lower costs are more efficient than route-shopper pairs associated with higher costs. For example, the cost engine 334 may determine a cost associated with a route-shopper pair that is proportional to a predicted distance that a shopper 208 included in the route-shopper pair is required to travel to fulfill an order associated with the route included in the route-shopper pair, a predicted amount of time required for the shopper 208 to travel this distance, and a predicted amount of time required for the shopper 208 to collect items included in the order.

In some embodiments, the cost engine 334 also may determine the cost associated with a route-shopper pair based on a weight associated with each of the set of predicted values associated with the route-shopper pair. In the above example, the predicted distance the shopper 208 is required to travel to fulfill the order and the predicted amount of time required for the shopper 208 to travel this distance may be associated with greater weights than the predicted amount of time required for the shopper 208 to collect the items included in the order. In various embodiments, the cost engine 334 may determine the cost associated with a route-shopper pair as a sum of the products of each predicted value associated with the route-shopper pair and its associated weight. Furthermore, in some embodiments, the weight associated with a predicted value may vary based on information associated with an order (e.g., a delivery window or a time that the order was placed, a number of items included in an order, etc.). In the above example, if the order is a large order (e.g., an order with more than a threshold number of items) associated with a delivery window that is outside of peak traffic hours, the weight associated with the predicted amount of time required for the shopper 208 to collect items included in the order may be greater than the weights associated with the other predicted values.

The shopper management engine 310 also includes a pairing cache 336, which stores each route-shopper pair in association with a cost determined for the route-shopper pair in the third step of the candidate generation process. Similar to the shopper cache 324 and the routing cache 328, the pairing cache 336 is a cache memory, which makes retrieving information from it more efficient. In some embodiments, each route-shopper pair is stored in association with the set of predicted values used to determine the cost associated with the route-shopper pair. In embodiments in which the cost associated with a route-shopper pair is determined based on a weight associated with each of the set of predicted values associated with the route-shopper pair, the weight associated with each predicted value also may be stored in association with the route-shopper pair in the pairing cache 336.

The optimization engine 338 executes an optimization process asynchronously with the candidate generation process. By executing the optimization process asynchronously with the candidate generation process, latency is improved since the selection process is not dependent on completion of the candidate generation process for all the sets of routes. This approach thus provides technical advantages such as more efficient usage of computational power and processing/network resources. The optimization process includes two steps, which are described below. In some embodiments, the optimization engine 338 executes the optimization process in response to receiving information identifying one or more routes generated for orders recently received by the online concierge system 102. For example, in response to receiving information identifying routes generated for orders received by the online concierge system 102 within at least a threshold amount of time of a present time, the optimization engine 338 executes the optimization process. In some embodiments, the optimization engine 338 also may execute the optimization process based on additional factors as well (e.g., after a specified amount of time has elapsed, after a sufficient number of routes have been generated by the routing engine 326, etc.).

In the first step of the optimization process, the optimization engine 338 accesses stored pairing-cost data (e.g., from the pairing cache 336), in which the pairing-cost data includes information identifying one or more route-shopper pairs (e.g., a route ID and a shopper ID combination) and their associated costs. For example, suppose that the optimization engine 338 executes the optimization process in response to receiving information identifying routes generated for orders recently received by the online concierge system 102. In this example, the optimization engine 338 accesses stored pairing-cost data that includes information identifying route-shopper pairs including the routes and their associated costs.

In the second step of the optimization process, the optimization engine 338 selects one or more route-shopper pairs based on pairing-cost data. In some embodiments, the optimization engine 338 may select a number of route-shopper pairs for each route that results in a minimum total cost for all route-shopper pairs. In various embodiments, the optimization engine 338 may do so using an optimization algorithm (e.g., a linear sum assignment algorithm). For example, the optimization engine 338 may identify route-shopper pairs including routes generated for orders recently received by the online concierge system 102 and access stored pairing-cost data that includes information identifying these route-shopper pairs. In this example, the optimization engine 338 may then select one or more of the identified route-shopper pairs using a linear sum assignment algorithm, such that the costs associated with the selected route-shopper pairs result in a minimum total cost for all route-shopper pairs. In some embodiments, the optimization engine 338 may select one or more route-shopper pairs by ranking different combinations of route-shopper pairs based on their total costs and selecting one or more route-shopper pairs based on the ranking, such that the selected route-shopper pair(s) are associated with a minimum total cost.

In embodiments in which the optimization engine 338 executes the optimization process in response to receiving information identifying one or more routes generated for orders recently received by the online concierge system 102, one or more routes generated for recent orders may not be included among the route-shopper pairs associated with costs. A route may not be included among the route-shopper pairs associated with costs for various reasons (e.g., because a pairing engine 332 and/or a cost engine 334 is/are not working or because the pairing engine 332 or the cost engine 334 has not completed pairing the route to shoppers 208 or determining a cost associated with each route-shopper pair, respectively). In embodiments in which any routes generated for recent orders are not included among the route-shopper pairs associated with costs, to provide fault tolerance, the optimization engine 338 may identify each of these routes, pair each of these routes with each of multiple shoppers 208 of the online concierge system 102, and determine the cost associated with each route-shopper pair. The optimization engine 338 may identify each route not included among the route-shopper pairs associated with costs based on a route ID associated with each order and each route-shopper pair. For example, the optimization engine 338 may access the routing cache 328 to identify a route ID associated with a recent order, access the pairing cache 336, and determine whether the route ID is associated with any route-shopper pairs associated with costs stored in the pairing cache 336. The optimization engine 338 may pair each route not included among the route-shopper pairs associated with costs with each of multiple shoppers 208 of the online concierge system 102 and determine the cost associated with each route-shopper pair in a manner analogous to that described above with respect to the pairing engine 332 and the cost engine 334. In embodiments in which any routes generated for recent orders are not included among the route-shopper pairs associated with costs, once the route(s) is/are included among the route-shopper pairs associated with costs, the optimization engine 338 may select one or more route-shopper pairs based on the cost associated with each route-shopper pair, as described above.

Selecting Optimal Pairings of Shoppers with Routes to Fulfill Orders Using an Asynchronous Process FIG. 4 is a flowchart of a method for selecting optimal pairings of shoppers with routes to fulfill orders placed in an online concierge system using an asynchronous process, according to one or more embodiments. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments, while in other embodiments, the steps of the method are performed by any online system capable of retrieving items.

The online concierge system 102 receives 405 (e.g., using the order fulfillment engine 306) information describing a set of orders from one or more customers 204 of the online concierge system 102 (e.g., via a client device 110 associated with each customer 204). The information received 405 by the online concierge system 102 describing each order identifies a retailer associated with the order, one or more items included in the order, a location associated with a customer 204 associated with the order (e.g., a delivery location), and a delivery time window associated with the order. In some embodiments, the information describing an order received 405 by the online concierge system 102 may not include a location associated with a customer 204; instead, the information may identify the customer 204 who placed the order. In such embodiments, the online concierge system 102 may retrieve a location associated with the customer 204 (e.g., a home address or a default/preferred delivery location from the customer database 314). The information describing each order also may include a time at which the order was received 405, an order confirmation number, a number of items included in the order, a total value of the items, a payment instrument used to place the order, information indicating whether the order was placed using the customer mobile application 206, categories, brands, or other attributes associated with items included in the order, or any other types of information that may be associated with an order.

The online concierge system 102 may generate 410 (e.g., using the order fulfillment engine 306) one or more batches of orders from the set of received orders. Orders may be batched based on the times at which they were received 405 by the online concierge system 102. For example, orders received 405 within the same time interval are included in a batch generated 410 by the online concierge system 102. Orders also may be batched based on other information associated with the orders (e.g., retailers associated with the orders, one or more items included in the orders, locations associated with customers 204 who placed the orders, delivery time windows for the orders, etc.), such that orders associated with similar information are more likely to be included in the same batch. For example, orders to be delivered to customers 204 associated with locations that are close to each other are more likely to be batched together than orders to be delivered to customers 204 associated with locations that are far apart.

In some embodiments, the online concierge system 102 may store 415 the information describing the set of received orders (e.g., in the transaction records database 308). In embodiments in which the online concierge system 102 generates 410 any batches from the orders, the online concierge system 102 may store 415 information describing the batches (e.g., in the transaction records database 308). The online concierge system 102 also or alternatively may store 415 information describing each received order and/or each batch including the order in association with information describing the customer 204 who placed the order (e.g., in the customer database 314).

The online concierge system 102 then generates 420 (e.g., using the routing engine 326) one or more routes for each order based on the information describing the order. As described above, each route generated 420 by the online concierge system 102 may be associated with an identifier (e.g., a route ID) that uniquely identifies the route. As also described above, a route generated 420 for an order may describe tasks that may be involved in fulfilling the order, such as proceeding to a location of a warehouse 210 associated with a retailer with which the order was placed, collecting items included in the order, purchasing the items, and delivering the items to a delivery location specified by a customer 204 who placed the order. In some embodiments, a route generated 420 for an order also may include turn-by-turn instructions for navigating to each location a shopper 208 is required to visit to fulfill the order. Furthermore, in various embodiments, the online concierge system 102 may determine various types of information associated with a route (e.g., fees associated with a route, speed limits along a route, traffic conditions associated with a route, etc.).

In some embodiments, the online concierge system 102 may generate 420 a route based on a distance between a location associated with a customer 204 and a location of a warehouse 210 and/or an amount of time required to travel this distance. For example, warehouses 210 identified by the routes generated 420 by the online concierge system 102 may be within a threshold distance of a location associated with a customer 204 and/or an amount of time required to travel the distance between them may be less than a threshold amount of time. In embodiments in which the online concierge system 102 generates 410 one or more batches of orders, the online concierge system 102 may generate 420 one or more routes for a batch of orders. In such embodiments, the online concierge system 102 may generate 420 the route(s) for the batch of orders based on distances between locations associated with customers 204 and locations of warehouses 210 and/or based on amounts of time required to travel these distances, as described above.

Figure 5:
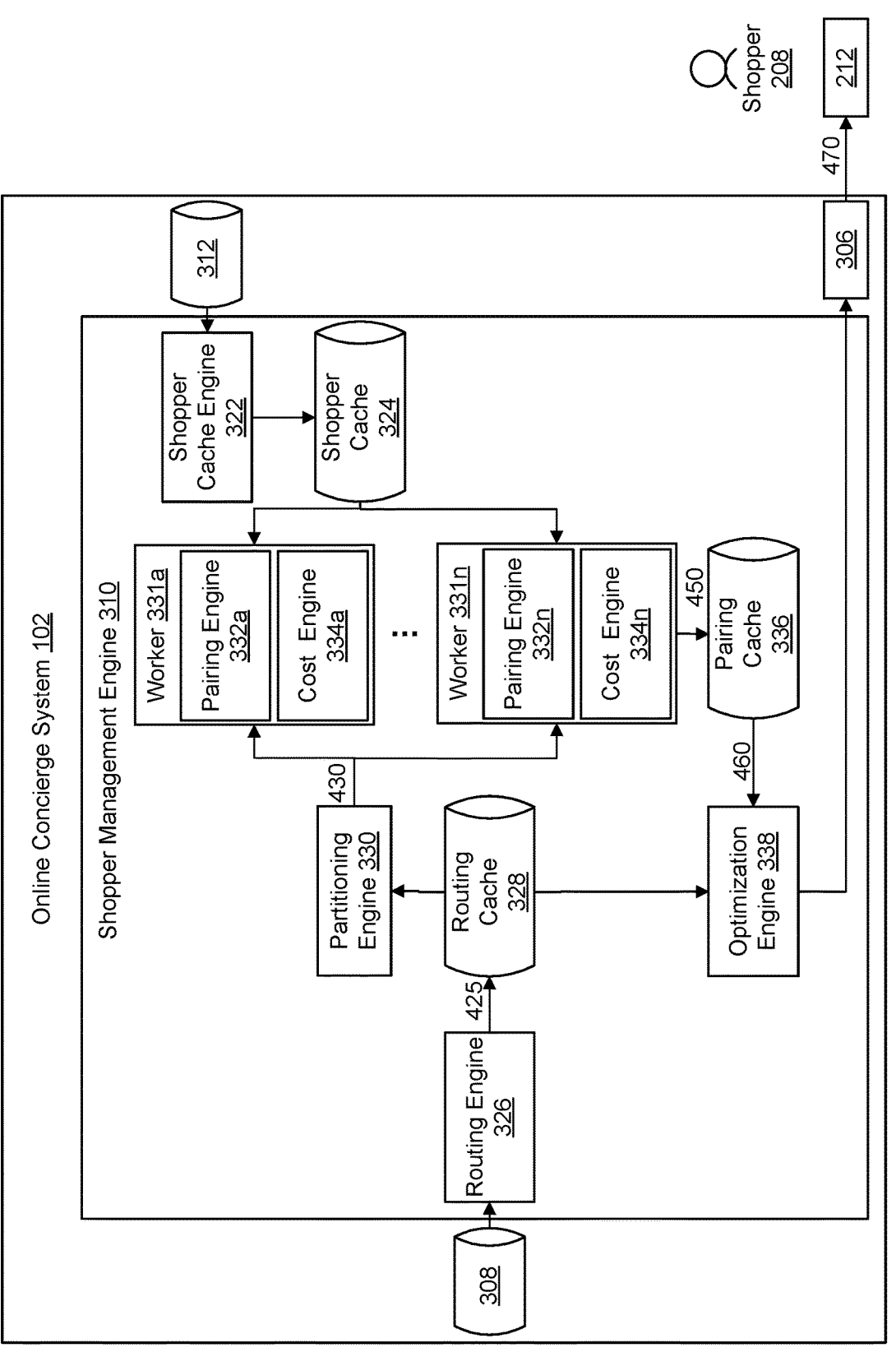
FIG. 5 is a conceptual diagram of a method for selecting optimal pairings of shoppers with routes to fulfill orders placed in an online concierge system using an asynchronous process, according to one or more embodiments.

In some embodiments, the online concierge system 102 stores 425 the route(s) for each order/batch in a cache memory (e.g., in the routing cache 328, as shown in FIG. 5), making retrieval of the routes(s) more efficient. In various embodiments, each route is stored 425 in association with an identifier (e.g., a route ID) that uniquely identifies the route. In embodiments in which the online concierge system 102 determines various types of information associated with a route, this information also may be stored 425 in association with the route. For example, the online concierge system 102 may store 425 information describing a speed limit along a route and average traffic conditions along the route in association with the route.

Referring now to FIG. 4, the online concierge system 102 then partitions 430 (e.g., using the partitioning engine 330) the routes into multiple sets of routes. The online concierge system 102 may partition 430 the routes via various methods. In one embodiment, the online concierge system 102 partitions 430 the routes randomly. In another embodiment, the online concierge system 102 partitions 430 the routes based on an order in which the orders associated with the routes were received 405 (e.g., chronologically). The number of sets of routes into which the online concierge system 102 partitions 430 the routes may be proportional to the number of routes generated 420 by the online concierge system 102. For example, every 100 routes may be partitioned 430 into 10 sets of 10 routes. In some embodiments, the number of sets of routes into which the online concierge system 102 partitions 430 the routes may be determined using a machine-learning model that predicts an optimal number of sets of routes. In such embodiments, the machine-learning model may be trained based on historical information describing a number of sets of routes into which the online concierge system 102 has partitioned (step 430) routes and an amount of time required to perform a candidate generation process on the sets of routes, which is further described below. Since the candidate generation process is performed in parallel for each of the sets of routes, as further described below, scalability may be improved by partitioning 430 the routes into more sets of routes. This may provide technical benefits in the form of computational efficiency and reduced usage of processing/computing resources. Furthermore, cost reduction may be achieved by using a greater number of less expensive workers 331 (described below) to perform the candidate generation process on each set of routes.

In one embodiment, the online concierge system 102 partitions 430 the routes based on a set of rules. The set of rules may be associated with an age restriction associated with purchasing an item included in an order, a membership associated with a retailer, a minimum cargo capacity associated with an order, a location of a warehouse 210 associated with a retailer, a location associated with a customer 204, or any other suitable types of information associated with a route. For example, if the online concierge system 102 partitions 430 the routes based on a rule corresponding to an age restriction associated with purchasing alcoholic beverages, the online concierge system 102 may include routes generated 420 for orders including alcoholic beverages in the same set of routes. In the above example, if the online concierge system 102 also partitions 430 the routes based on a rule that requires memberships associated with various retailers, the online concierge system 102 may include routes generated 420 for orders including alcoholic beverages for each retailer requiring a membership in the same set of routes. As another example, if the online concierge system 102 partitions 430 the routes based on a rule corresponding to a minimum cargo capacity associated with each route, the online concierge system 102 may partition 430 the routes into different sets of routes that each are associated with a different range of minimum cargo capacities. As an additional example, if the online concierge system 102 partitions 430 the routes based on a rule associated with a location of a warehouse 210 associated with a retailer and/or a location associated with a customer 204, the online concierge system 102 may partition 430 the routes into different sets of routes that each are associated with a different geographic location, in which each set of routes is associated with a location of a warehouse 210 and/or a location associated with a customer 204 that is in the same geographic location.

Once the online concierge system 102 has partitioned 430 the routes into multiple sets of routes, the online concierge system 102 executes 435 (e.g., using multiple workers 331 that each include a pairing engine 332 and a cost engine 334) multiple candidate generation processes in parallel for the sets of routes, such that each candidate generation process is executed 435 with respect to a particular set of routes. As such, the candidate generation process for one set of routes may be executed 435 independently of the candidate generation process for a different set of routes, reducing latency. As shown in FIG. 5, once the routes have been partitioned 430 into multiple sets of routes, the candidate generation processes are executed 435 in parallel for the sets of routes by multiple workers 331, in which each worker 331 includes a pairing engine 332 and a cost engine 334 and executes 435 a candidate generation process for a set of routes. The candidate generation process includes three steps, which are further described below.

Referring back to FIG. 4, in the first step of the candidate generation process, for each of the multiple sets of routes, the online concierge system 102 pairs 440 (e.g., using a pairing engine 332) each route included among the set of routes with each of multiple shoppers 208 of the online concierge system 102, which results in multiple route-shopper pairs. The online concierge system 102 may retrieve information describing each shopper 208 from a database (e.g., the shopper database 312). Alternatively, in various embodiments, to improve the efficiency with which the online concierge system 102 may retrieve information describing each shopper 208, the online concierge system 102 may retrieve this information from a cache memory (e.g., the shopper cache 324, as shown in the example of FIG. 5).

Referring back to FIG. 4, in some embodiments, the online concierge system 102 pairs 440 each route with a shopper 208 based on a set of constraints. The set of constraints may include an age restriction associated with purchasing an item, a membership required by a retailer, a minimum cargo capacity, a threshold distance between a location associated with a shopper 208 and a location associated with an order (e.g., a location of a customer 204 and/or a warehouse 210 associated with a retailer), a threshold amount of time required to travel a distance between a location associated with a shopper 208 and a location associated with an order, an availability of a shopper 208 to fulfill an order, etc. For example, if the set of constraints includes an age restriction associated with purchasing various items (e.g., alcohol, tobacco, prescriptions, etc.), the online concierge system 102 may only pair (step 440) routes generated 420 for orders including such items with shoppers 208 who satisfy the age restriction. As an additional example, if the set of constraints includes a membership required by a retailer, the online concierge system 102 may only pair (step 440) routes generated 420 for orders with the retailer with shoppers 208 who have the required membership. As yet another example, if the set of constraints includes a minimum cargo capacity associated with an order, the online concierge system 102 may only pair 440 a route generated 420 for the order with shoppers 208 associated with a cargo capacity that is at least the minimum cargo capacity. As another example, suppose that the set of constraints includes a threshold distance between a shopper 208 and one or more locations associated with an order (e.g., a location of a customer 204 and/or a warehouse 210 associated with a retailer) or a threshold amount of time required to travel a distance between the shopper 208 and the location(s) associated with the order. In this example, the online concierge system 102 may only pair 440 a route generated 420 for the order with shoppers 208 associated with locations within the threshold distance of the location associated with the order or with shoppers 208 who may travel to the location associated with the order within the threshold amount of time.

Each route-shopper pair output by the online concierge system 102 may be associated with a set of predicted values that are based on a set of attributes associated with a shopper 208 included in the route-shopper pair and/or information associated with a route included in the route-shopper pair. In some embodiments, the set of predicted values associated with a route-shopper pair may be associated with a measure of efficiency of the route-shopper pair. For example, a set of predicted values associated with a route-shopper pair may include a predicted amount of time a shopper 208 included in the route-shopper pair is required to travel to fulfill an order associated with a route included in the route-shopper pair and/or a predicted distance the shopper 208 is required to travel to fulfill the order. As an additional example, a set of predicted values associated with a route-shopper pair may include a predicted amount of time required for a shopper 208 included in the route-shopper pair to collect items included in an order associated with a route included in the route-shopper pair and/or a predicted likelihood that the shopper 208 will make an error collecting the items.

In some embodiments, the set of predicted values associated with each route-shopper pair may be predicted using a machine learning model based on a set of attributes associated with the shopper 208 included in the route-shopper pair and/or information associated with the route included in the route-shopper pair. In such embodiments, the model may be trained based on historical information associated with previous orders stored 415 in the online concierge system 102 (e.g., in the shopper database 312, etc.). For example, the machine learning model may predict an amount of time required by a shopper 208 to collect items included in an order associated with a route with which the shopper 208 is paired 440 and a rating the shopper 208 is likely to receive when fulfilling the order based on a shopping history of the shopper 208 and previous ratings received by the shopper 208 stored in the online concierge system 102.

In the second step of the candidate generation process, once each route included among a set of routes is paired 440 with a shopper 208, the online concierge system 102 determines 445 (e.g., using a cost engine 334) a cost associated with the route-shopper pair based on the set of predicted values associated with the route-shopper pair. In some embodiments, the cost associated with each route-shopper pair may indicate an efficiency of the route-shopper pair. For example, the cost associated with a route-shopper pair may indicate an efficiency associated with fulfillment of an order associated with the route by the shopper 208. Furthermore, the cost associated with a route-shopper pair may be inversely proportional to an efficiency of the route-shopper pair, such that route-shopper pairs associated with lower costs are more efficient than route-shopper pairs associated with higher costs. For example, the online concierge system 102 may determine 445 a cost associated with a route-shopper pair that is proportional to a predicted distance that a shopper 208 included in the route-shopper pair is required to travel to fulfill an order associated with the route included in the route-shopper pair, a predicted amount of time required for the shopper 208 to travel this distance, and a predicted amount of time required for the shopper 208 to collect items included in the order.

In some embodiments, the online concierge system 102 also may determine 445 the cost associated with each route-shopper pair based on a weight associated with each of the set of predicted values associated with the route-shopper pair. In the above example, the predicted distance the shopper 208 is required to travel to fulfill the order and the predicted amount of time required for the shopper 208 to travel this distance may be associated with greater weights than the predicted amount of time required for the shopper 208 to collect the items included in the order. In various embodiments, the online concierge system 102 may determine 445 the cost associated with a route-shopper pair as a sum of the products of each predicted value associated with the route-shopper pair and its associated weight. Furthermore, in some embodiments, the weight associated with a predicted value may vary based on information associated with an order (e.g., a delivery window or a time that the order was placed, a number of items included in the order, etc.). In the above example, if the order is a large order (e.g., an order with more than a threshold number of items) associated with a delivery window that is outside of peak traffic hours, the weight associated with the predicted amount of time required for the shopper 208 to collect items included in the order may be greater than the weights associated with the other predicted values.

Figure 6:
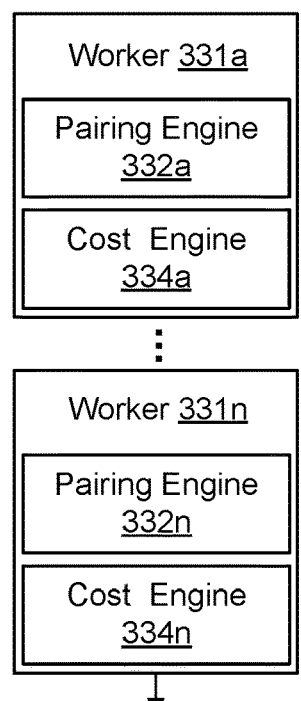
FIG. 6 is an example illustrating the storage of pairings of routes with shoppers of an online concierge system in association with a cost associated with each pairing, according to one or more embodiments.

In the third step of the candidate generation process, once the online concierge system 102 determines 445 a cost associated with each route-shopper pair, the online concierge system 102 may store 450 the route-shopper pair in association with the cost in a cache memory (e.g., in the pairing cache 336, as shown in FIG. 5), which makes retrieving information from it more efficient. In some embodiments, each route-shopper pair is stored 450 in association with the set of predicted values used to determine 445 the cost associated with the route-shopper pair. For example, as shown in FIG. 6, each route-shopper pair identified by a route ID 605 and a shopper ID 610 included in the route-shopper pair is stored 450 in a table in association with a set of predicted values (e.g., a predicted driving time 615, a predicted driving distance 620, and a predicted collecting time 625) and a cost 630 determined 445 for the route-shopper pair. Although not depicted in FIG. 6, in some embodiments, a weight associated with each of the set of predicted values used to determine 445 the cost associated with each route-shopper pair also may be stored 450 in association with the route-shopper pair.

Referring again to FIG. 4, the online concierge system 102 executes 455 (e.g., using the optimization engine 338), an optimization process asynchronously with the candidate generation process. By executing 455 the optimization process asynchronously with the candidate generation process, latency is improved since the selection process is not dependent on completion of the candidate generation process for all the sets of routes. This approach thus provides technical advantages such as more efficient usage of computational power and processing/network resources. The optimization process includes two steps, which are described below. In some embodiments, the online concierge system 102 executes 455 the optimization process in response to receiving information identifying one or more routes generated 420 for orders recently received 405 by the online concierge system 102. For example, in response to receiving information identifying routes generated 420 for orders received 405 by the online concierge system 102 within at least a threshold amount of time of a present time, the online concierge system 102 executes 455 the optimization process. In some embodiments, the online concierge system 102 also may execute 455 the optimization process based on additional factors as well (e.g., after a specified amount of time has elapsed, after a sufficient number of routes have been generated 420, etc.).

In the first step of the optimization process, the online concierge system 102 accesses 460 (e.g., using the optimization engine 338) stored pairing-cost data (e.g., from the pairing cache 336, as shown in FIG. 5), in which the pairing-cost data includes information identifying one or more route-shopper pairs (e.g., a route ID 605 and a shopper ID 610 combination) and their associated costs. For example, suppose that the online concierge system 102 executes 455 the optimization process in response to receiving information identifying routes generated 420 for orders recently received 405 by the online concierge system 102. In this example, the online concierge system 102 accesses 460 stored pairing-cost data that includes information identifying route-shopper pairs including the routes.

In the second step of the optimization process, the online concierge system 102 selects 465 (e.g., using the optimization engine 338) one or more route-shopper pairs based on the pairing-cost data. In some embodiments, the online concierge system 102 may select 465 a number of route-shopper pairs for each route that results in a minimum total cost for all route-shopper pairs. In various embodiments, the online concierge system 102 may do so using an optimization algorithm (e.g., a linear sum assignment algorithm). For example, the online concierge system 102 may identify route-shopper pairs including routes generated 420 for orders recently received 405 by the online concierge system 102 and access 460 stored pairing-cost data that includes information identifying these route-shopper pairs. In this example, the online concierge system 102 may then select 465 one or more of the identified route-shopper pairs using a linear sum assignment algorithm, such that the costs associated with the selected route-shopper pairs result in a minimum total cost for all route-shopper pairs. In some embodiments, the online concierge system 102 may select 465 the route-shopper pair(s) by ranking different combinations of route-shopper pairs based on their total costs and selecting 465 one or more route-shopper pairs based on the ranking, such that the selected route-shopper pair(s) are associated with a minimum total cost.

In embodiments in which the online concierge system 102 executes 455 the optimization process in response to receiving information identifying one or more routes generated 420 for orders recently received 405 by the online concierge system 102, one or more routes generated 420 for recent orders may not be included among the route-shopper pairs associated with costs. A route may not be included among the route-shopper pairs associated with costs for various reasons (e.g., because a pairing engine 332 and/or a cost engine 334 is/are not working or because the online concierge system 102 has not completed pairing 440 the route to shoppers 208 or determining 445 a cost associated with each route-shopper pair). In embodiments in which any routes generated 420 for recent orders are not included among the route-shopper pairs associated with costs, to provide fault tolerance, the online concierge system 102 may identify each of these routes (e.g., using the optimization engine 338 based on a route ID associated with each order and each route-shopper pair). The online concierge system 102 may then pair (e.g., using the optimization engine 338) each of these routes with each of multiple shoppers 208 of the online concierge system 102 and determine (e.g., using the optimization engine 338) the cost associated with each route-shopper pair. The online concierge system 102 may do so in a manner analogous to that described above with respect to steps 440 and 445. In embodiments in which any routes generated 420 for recent orders are not included among the route-shopper pairs associated with costs, once the route(s) is/are included among the route-shopper pairs associated with costs, the online concierge system 102 may select 465 one or more route-shopper pairs based on the cost associated with each route-shopper pair, as described above.

The online concierge system 102 then sends 470 (e.g., using the order fulfillment engine 306) one or more requests to fulfill a set of orders associated with the route-shopper pair(s) selected 465 by the online concierge system 102 to one or more shoppers 208 associated with the route-shopper pair(s) (e.g., via a client device 110 associated with each shopper 208). For example, a request to fulfill an order associated with a route-shopper pair selected 465 by the online concierge system 102 is sent 470 to a shopper 208 included in the route-shopper pair. In embodiments in which a route included in a route-shopper pair selected 465 by the online concierge system 102 is associated with a batch of orders, the online concierge system 102 sends 470 a request to fulfill the batch of orders to the shopper 208 included in the route-shopper pair. Once the request(s) is/are sent 470 to the shopper(s) 208, the request(s) may be displayed to the shopper(s) 208 (e.g., via the shopper mobile application 212, as shown in FIG. 5). A shopper 208 may then accept or reject the request and proceed to fulfill the request upon acceptance of the request. If the request is not accepted within a certain amount of time (e.g., within a threshold amount of time from when a corresponding order was received 405), one or more steps may be repeated for the corresponding order or for one or more routes generated 420 for the order (e.g., by proceeding back to step 420 or step 430 described above).

Additional Considerations

The foregoing description of the embodiments of the invention has been presented for the purpose of illustration; it is not intended to be exhaustive or to limit the invention to the precise forms disclosed. Many modifications and variations are possible in light of the above disclosure.

Some portions of this description describe the embodiments of the invention in terms of algorithms and symbolic representations of operations on information. These algorithmic descriptions and representations are commonly used in the data processing arts to convey the substance of their work effectively to others. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

storing computer-executable instructions for a workflow in a non-transitory computer-readable medium, wherein the computer-executable instructions comprises instructions for a first part of the workflow and instructions for a second part of the workflow, wherein:

the instructions for the first part of the workflow comprise computer-executable instructions that, when executed by a processor, cause the processor to execute a candidate generation process, and the instructions for the second part of the workflow comprise computer-executable instructions that, when executed by a processor, cause the processor to execute an optimization process;

receiving order information for a plurality of orders from one or more devices associated with one or more customers of an online concierge system, wherein the order information describes, for each order, information identifying one or more ordered items, a warehouse location, and a customer location;

passing each of the orders to one of a plurality of candidate generation processes;

executing, in parallel by a first subset of a plurality of processors of the online concierge system, the plurality of candidate generation processes, wherein executing a candidate generation process in parallel comprises executing, by a processor of the first subset of processors, the computer-executable instructions for the first part of the workflow, wherein each candidate generation process is configured to perform a first part of a workflow for processing an order of the plurality of orders, wherein the first part of the workflow for processing an order comprises:

selecting, by a processor of the first subset of the plurality of processors, a shopper of a set of shoppers that satisfies a set of constraints for fulfilling the order, predicting, by the processor of the first subset of the plurality of processors, a cost for fulfillment of the order by the selected shopper, the cost based on an attribute associated with the shopper or information about the order, and storing, by the processor of the first subset of the plurality of processors, a candidate route-shopper pair and the corresponding cost in a memory, wherein the candidate route-shopper pair corresponds to the selected shopper of the set of shoppers and a route associated with the order;

executing, by a second subset of the plurality of processors of the online concierge system asynchronously with the candidate generation processes, a second part of the workflow for processing an order of the plurality of orders, wherein executing the second part of the workflow comprises executing, by a processor of the second subset of processors, the computer-executable instructions for the second part of the workflow, wherein the second part of the workflow comprises an optimization process comprising:

iteratively accessing, from the memory, the candidate route-shopper pairs and corresponding costs as the candidate generation processes generate the candidate route-shopper and corresponding costs by performing the first part of the workflow for processing an order, selecting a candidate route-shopper pair of the generated candidate route-shopper pairs for each target order from the accessed candidate route-shopper pairs based on the corresponding costs by:

applying a linear sum assignment algorithm to the generated candidate route-shopper pairs; and sending, for each selected route-shopper pair, a request to fulfill the order associated with the selected route-shopper pair to a device associated with the shopper corresponding to the selected route-shopper pair.

2. The method of claim 1, wherein predicting a cost for fulfillment of the order comprises determining the cost based on at least one of: a travel time, a travel distance, and an amount of time required to collect the one or more items included in the order.

3. The method of claim 1, wherein predicting a cost for fulfillment of the order comprises using a machine learning model to predict at least a component of the cost.

4. The method of claim 1, wherein selecting a shopper that satisfies a set of constraints for fulfilling the order comprises applying a set of constraints that include one or more of: an age restriction associated with purchasing an item included in the set of orders, an age of a shopper of the plurality of shoppers associated with the online concierge system, a membership associated with a retailer, one or more memberships associated with the shopper, a minimum cargo capacity associated with one or more orders of the set of orders, a cargo capacity associated with the shopper, an availability of the shopper to fulfill each of the one or more orders, a shopper location associated with the shopper, the retail location of the warehouse associated with the retailer, the customer location associated with the customer, a threshold distance between the shopper location associated with the shopper and the retail location of the warehouse associated with the retailer, a threshold distance between the customer location associated with the customer and the shopper location associated with the shopper, a threshold amount of time required to travel a distance between the shopper location associated with the shopper and the retail location of the warehouse associated with the retailer, and a threshold amount of time required to travel a distance between the customer location associated with the customer and the shopper location associated with the shopper.

5. The method of claim 1, wherein passing each of the orders to one of a plurality of candidate generation processes comprises partitioning the plurality of orders based at least in part on: an age restriction associated with purchasing an item included in the orders, a membership associated with a retailer, a minimum cargo capacity associated with the orders, the warehouse location associated with the orders, and the customer location associated with the orders.

6. The method of claim 1, wherein passing each of the orders to one of a plurality of candidate generation processes comprises randomly partitioning the plurality of orders.

7. A computer program product comprising a non-transitory computer readable storage medium having instructions encoded thereon that, when executed by a processor, cause the processor to perform the steps of:

storing computer-executable instructions for a workflow in a non-transitory computer-readable medium, wherein the computer-executable instructions comprises instructions for a first part of the workflow and instructions for a second part of the workflow, wherein:

the instructions for the first part of the workflow comprise computer-executable instructions that, when executed by a processor, cause the processor to execute a candidate generation process, and the instructions for the second part of the workflow comprise computer-executable instructions that, when executed by a processor, cause the processor to execute an optimization process;

receiving order information for a plurality of orders from one or more devices associated with one or more customers of an online concierge system, wherein the order information describes, for each order, information identifying one or more ordered items, a warehouse location, and a customer location;

passing each of the orders to one of a plurality of candidate generation processes;

executing, in parallel by a first subset of a plurality of processors of the online concierge system, the plurality of candidate generation processes, wherein executing a candidate generation process in parallel comprises executing, by a processor of the first subset of processors, the computer-executable instructions for the first part of the workflow, wherein each candidate generation process is configured to perform a first part of a workflow for processing an order of the plurality of orders, wherein the first part of the workflow for processing an order comprises:

selecting, by a processor of the first subset of the plurality of processors, a shopper of a set of shoppers that satisfies a set of constraints for fulfilling the order, predicting, by the processor of the first subset of the plurality of processors, a cost for fulfillment of the order by the selected shopper, the cost based on an attribute associated with the shopper or information about the order, and storing, by the processor of the first subset of the plurality of processors, a candidate route-shopper pair and the corresponding cost in a memory, wherein the candidate route-shopper pair corresponds to the selected shopper of the set of shoppers and a route associated with the order;

executing, by a second subset of the plurality of processors of the online concierge system asynchronously with the candidate generation processes, a second part of the workflow for processing an order of the plurality of orders, wherein executing the second part of the workflow comprises executing, by a processor of the second subset of processors, the computer-executable instructions for the second part of the workflow, wherein the second part of the workflow comprises an optimization process comprising:

iteratively accessing, from the memory, the candidate route-shopper pairs and corresponding costs as the candidate generation processes generate the candidate route-shopper and corresponding costs by performing the first part of the workflow for processing an order, selecting a candidate route-shopper pair of the generated candidate route-shopper pairs for each target order from the accessed candidate route-shopper pairs based on the corresponding costs by:

applying a linear sum assignment algorithm to the generated candidate route-shopper pairs; and sending, for each selected route-shopper pair, a request to fulfill the order associated with the selected route-shopper pair to a device associated with the shopper corresponding to the selected route-shopper pair.

8. The computer program product of claim 7, wherein predicting a cost for fulfillment of the order comprises determining the cost based on at least one of: a travel time, a travel distance, and an amount of time required to collect the one or more items included in the order.

9. The computer program product of claim 7, wherein predicting a cost for fulfillment of the order comprises using a machine learning model to predict at least a component of the cost.

10. The computer program product of claim 7, wherein selecting a shopper that satisfies a set of constraints for fulfilling the order comprises applying a set of constraints that include one or more of: an age restriction associated with purchasing an item included in the set of orders, an age of a shopper of the plurality of shoppers associated with the online concierge system, a membership associated with a retailer, one or more memberships associated with the shopper, a minimum cargo capacity associated with one or more orders of the set of orders, a cargo capacity associated with the shopper, an availability of the shopper to fulfill each of the one or more orders, a shopper location associated with the shopper, the retail location of the warehouse associated with the retailer, the customer location associated with the customer, a threshold distance between the shopper location associated with the shopper and the retail location of the warehouse associated with the retailer, a threshold distance between the customer location associated with the customer and the shopper location associated with the shopper, a threshold amount of time required to travel a distance between the shopper location associated with the shopper and the retail location of the warehouse associated with the retailer, and a threshold amount of time required to travel a distance between the customer location associated with the customer and the shopper location associated with the shopper.

11. The computer program product of claim 7, wherein passing each of the orders to one of a plurality of candidate generation processes comprises partitioning the plurality of orders based at least in part on: an age restriction associated with purchasing an item included in the orders, a membership associated with a retailer, a minimum cargo capacity associated with the orders, the warehouse location associated with the orders, and the customer location associated with the orders.

12. The computer program product of claim 7, wherein passing each of the orders to one of a plurality of candidate generation processes comprises randomly partitioning the plurality of orders.

13. A computer system comprising:
a processor;
a non-transitory computer readable storage medium storing instructions that, when executed by the processor, cause the processor to perform the steps of:
    storing computer-executable instructions for a workflow in a non-transitory computer-readable medium, wherein the computer-executable instructions comprises instructions for a first part of the workflow and instructions for a second part of the workflow, wherein:
        the instructions for the first part of the workflow comprise computer-executable instructions that, when executed by a processor, cause the processor to execute a candidate generation process, and
        the instructions for the second part of the workflow comprise computer-executable instructions that, when executed by a processor, cause the processor to execute an optimization process;
    receiving order information for a plurality of orders from one or more devices associated with one or more customers of an online concierge system, wherein the order information describes, for each order, information identifying one or more ordered items, a warehouse location, and a customer location;
    passing each of the orders to one of a plurality of candidate generation processes;
    executing, in parallel by a first subset of a plurality of processors of the online concierge system, the plurality of candidate generation processes, wherein executing a candidate generation process in parallel comprises executing, by a processor of the first subset of processors, the computer-executable instructions for the first part of the workflow, wherein each candidate generation process is configured to perform a first part of a workflow for processing an order of the plurality of orders, wherein the first part of the workflow for processing an order comprises:
        selecting, by a processor of the first subset of the plurality of processors, a shopper of a set of shoppers that satisfies a set of constraints for fulfilling the order,
        predicting, by the processor of the first subset of the plurality of processors, a cost for fulfillment of the order by the selected shopper, the cost based on an attribute associated with the shopper or information about the order, and
        storing, by the processor of the first subset of the plurality of processors, a candidate route-shopper pair and the corresponding cost in a memory, wherein the candidate route-shopper pair corresponds to the selected shopper of the set of shoppers and a route associated with the order;
    executing, by a second subset of the plurality of processors of the online concierge system asynchronously with the candidate generation processes, a second part of the workflow for processing an order of the plurality of orders, wherein executing the second part of the workflow comprises executing, by a processor of the second subset of processors, the computer-executable instructions for the second part of the workflow, wherein the second part of the workflow comprises an optimization process comprising:
    iteratively accessing, from the memory, the candidate route-shopper pairs and corresponding costs as the candidate generation processes generate the candidate route-shopper and corresponding costs by performing the first part of the workflow for processing an order,
    selecting a candidate route-shopper pair of the generated candidate route-shopper pairs for each target order from the accessed candidate route-shopper pairs based on the corresponding costs by:
        applying a linear sum assignment algorithm to the generated candidate route-shopper pairs; and
    sending, for each selected route-shopper pair, a request to fulfill the order associated with the selected route-shopper pair to a device associated with the shopper corresponding to the selected route-shopper pair.

14. The computer system of claim 13, wherein predicting a cost for fulfillment of the order comprises determining the cost based on at least one of: a travel time, a travel distance, and an amount of time required to collect the one or more items included in the order.

15. The computer system of claim 14, wherein predicting a cost for fulfillment of the order comprises using a machine learning model to predict at least a component of the cost.

16. The computer system of claim 13, wherein selecting a shopper that satisfies a set of constraints for fulfilling the order comprises applying a set of constraints that include one or more of: an age restriction associated with purchasing an item included in the set of orders, an age of a shopper of the plurality of shoppers associated with the online concierge system, a membership associated with a retailer, one or more memberships associated with the shopper, a minimum cargo capacity associated with one or more orders of the set of orders, a cargo capacity associated with the shopper, an availability of the shopper to fulfill each of the one or more orders, a shopper location associated with the shopper, the retail location of the warehouse associated with the retailer, the customer location associated with the customer, a threshold distance between the shopper location associated with the shopper and the retail location of the warehouse associated with the retailer, a threshold distance between the customer location associated with the customer and the shopper location associated with the shopper, a threshold amount of time required to travel a distance between the shopper location associated with the shopper and the retail location of the warehouse associated with the retailer, and a threshold amount of time required to travel a distance between the customer location associated with the customer and the shopper location associated with the shopper.

17. The computer system of claim 13, wherein passing each of the orders to one of a plurality of candidate generation processes comprises partitioning the plurality of orders based at least in part on: an age restriction associated with purchasing an item included in the orders, a membership associated with a retailer, a minimum cargo capacity associated with the orders, the warehouse location associated with the orders, and the customer location associated with the orders.

18. The computer system of claim 13, wherein passing each of the orders to one of a plurality of candidate generation processes comprises randomly partitioning the plurality of orders.

* * * * *